United States Patent
Kondo

(10) Patent No.: US 7,679,661 B2
(45) Date of Patent: Mar. 16, 2010

(54) IMAGING APPARATUS HAVING A CORRECTION SECTION FOR CORRECTING A VERTICAL STRIPE-LIKE NOISE AND A DARK SHADING IN THE HORIZONTAL DIRECTION

(75) Inventor: Toru Kondo, Hino (JP)

(73) Assignee: Olympus Corporation, Tokyo (JP)

( * ) Notice: Subject to any disclaimer, the term of this patent is extended or adjusted under 35 U.S.C. 154(b) by 706 days.

(21) Appl. No.: 11/474,404

(22) Filed: Jun. 26, 2006

(65) Prior Publication Data
US 2006/0290628 A1 Dec. 28, 2006

(30) Foreign Application Priority Data
Jun. 28, 2005 (JP) .............................. 2005-188126

(51) Int. Cl.
*H04N 3/14* (2006.01)
(52) U.S. Cl. ...................... 348/294; 348/246; 348/241; 348/243
(58) Field of Classification Search ................. 348/247, 348/246, 241, 243
See application file for complete search history.

(56) References Cited

U.S. PATENT DOCUMENTS 6,340,989 B1 * 1/2002 Oda ........................... 348/246

2006/0103742 A1 * 5/2006 Kubo et al. .................. 348/241

FOREIGN PATENT DOCUMENTS

| JP | 10-313428 | 11/1998 |
| JP | 2000-261730 | 9/2000 |

* cited by examiner

*Primary Examiner*—Jason Chan
*Assistant Examiner*—Cynthia Calderon
(74) *Attorney, Agent, or Firm*—Westerman, Hattori, Daniels & Adrian, LLP

(57) ABSTRACT

Disclosed herein is an imaging apparatus including: a pixel section having a plurality of pixels arranged in two dimensions for effecting photoelectric conversion; a light blocking section for blocking light to conceal the pixel section in accordance with a light blocking instruction signal; a region setting section for outputting the light blocking instruction signal and setting a correcting pixel region from which pixel data for correction are extracted within an effective pixel region of the pixel section where an object image is formed; a line memory for retaining pixel data from the correcting pixel region at the time of blocking light; and a correcting section for correcting an output of pixel data from the pixel section using the pixel data retained at the line memory.

8 Claims, 9 Drawing Sheets

CORRECTING OF IMAGING SIGNAL

IMAGING APPARATUS HAVING A CORRECTION SECTION FOR CORRECTING A VERTICAL STRIPE-LIKE NOISE AND A DARK SHADING IN THE HORIZONTAL DIRECTION

This application claims benefit of Japanese Patent Application No. 2005-188126 filed in Japan on Jun. 28, 2005, the contents of which are incorporated by this reference.

BACKGROUND OF THE INVENTION

The present invention relates to imaging apparatus, and more particularly relates to an imaging apparatus using an amplified MOS image sensor.

Solid-state imaging apparatus such as CCD image sensor or MOS image sensor are the apparatus for converting light into electrical signals and are widely used for example in digital cameras. FIG. 1A shows an example of the construction of a prior-art MOS image sensor.

The MOS image sensor of this example includes: unit pixels 11 disposed in a matrix each having a photodiode PD1 serving as a photoelectric conversion section, an amplification transistor M1 for amplifying detection signals of the photodiode PD1, a reset transistor M2 for resetting the detection signals of the photodiode PD1, a row select transistor M3 for selecting each row, and a pixel power supply VDD; a vertical scanning section 12 for driving the unit pixels 11; a vertical signal line 13 for outputting signal voltage of the unit pixel 11; a bias transistor M5 for causing a flow of constant current through the vertical signal line 13; a bias current adjusting voltage VBIAS for determining a current value of the bias transistor M5; a clamping capacitor C11 connected to the vertical signal line 13; a hold capacitor C12 for retaining change in voltage of the vertical signal line 13; a sample-and-hold transistor M12 for connecting between the clamping capacitor C11 and the hold capacitor C12; a clamping transistor M11 for clamping the clamping capacitor C11 and hold capacitor C12 to a predetermined voltage; a column select transistor M13 connected at one terminal thereof to one end of the hold capacitor C12 for reading signals from the hold capacitor 12 of each column; a horizontal signal line 15 connected to the other terminal of the column select transistor M13; an output amplifier 16; and a horizontal scanning section 14 for driving the column select transistor M13. It should be noted that the clamping capacitor C11, hold capacitor C12, clamping transistor M11, and sample-and-hold transistor M12 constitute a noise suppressing section 17 of every one column.

FIG. 1B schematically shows a drive timing chart for explaining operation of the MOS image sensor of the prior-art example having the construction as described. When row select pulse φ ROW1 of the first row outputted from the vertical scanning section 12 is driven to H-level, the row select transistors M3 of each unit pixel 11 of the first line are turned ON so that the signal voltage of the unit pixel 11 is outputted onto the vertical signal line 13. At this time, the sample-and-hold transistor M12 and clamping transistor M11 are turned ON by driving clamping control pulse φ CLP to H-level and sample-and-hold control pulse φ SH to H-level, so as to fix the clamping capacitor C11 and the sample-and-hold capacitor C12 to a reference potential VREF.

Next the clamping transistor M11 is turned OFF by driving the clamping control pulse φ CLP to L-level so as to bring the connecting line between the clamping capacitor C11 and the hold capacitor C12 to its floating state. Subsequently the reset transistor M2 is turned ON by driving reset control pulse φ RES1 of the first row to H-level to reset the detection signals of the photodiode PD1, and then the reset control pulse φ RES1 is returned to L-level again to turn OFF the reset transistor M2. At this time, a voltage change Δ Vsig before and after the resetting of photodiode PD1 occurs on the vertical signal line 13 and is accumulated at the hold capacitor C12 through the clamping capacitor C11 and sample-and-hold transistor M12.

Subsequently, the sample-and-hold control pulse φ SH is driven to L-level to turn OFF the sample-and-hold transistor M12 so that the signal component of photodiode PD1 is retained at the hold capacitor C12. Finally, the signal component retained at the hold capacitor C12 is sequentially read out to the horizontal signal line 15 by means of horizontal select pulses φ H1, φ H2 outputted from the horizontal scanning section 14 and is fetched from the output amplifier 16.

At this time, there is a problem when the obtained signals are formed into an image that a vertical stripe-like noise and/or dark shading in the horizontal direction occurs due to variance in the noise suppressing section 17 provided for each column or due to difference in load of the clock outputted from the horizontal scanning section 14.

In MOS image sensor of the prior-art construction, therefore, the technique as described below is employed to correct the vertical stripe-like noise and/or horizontal dark shading. Shown in FIGS. 2 and 3 are block diagrams for explaining the technique disclosed in Japanese Patent Application Laid-Open 2000-261730 with which the vertical stripe-like noise and horizontal dark shading are corrected.

FIG. 2 shows in a simplified manner the construction of the prior-art MOS image sensor shown in FIG. 1A, where like components as in FIG. 1A are denoted by like reference numerals. An OB region 1c with a surface covered with a light blocking film and an effective pixel region 1b to be used in actual image taking are provided within a full-pixel region 1a where a plurality of unit pixels are disposed in a matrix, and an upper side of the OB region 1c is determined as a vertical OB region 1d.

FIG. 3 is a block diagram showing the construction of an imaging apparatus mounting the image sensor shown in FIG. 2. This imaging apparatus includes: an image sensor 10; an A/D conversion section 20 for changing signals from the image sensor 10 into digital signals; a vertical OB region adding/averaging section 30 for extracting and adding/averaging in the column direction the signals corresponding to the vertical OB region 1d of the image sensor 10 out of the signals from the A/D conversion section 20; a line memory 40 for retaining signals (correction data) from the vertical OB region adding/averaging section 30; a subtraction section 50 for subtracting correction data retained at the line memory 40 from imaging signals; and an image processing section 60 for effecting an image processing of and providing as image signals the signals from the subtraction section 50.

In this correction technique, those obtained by adding and averaging along the column direction the signals of the vertical OB region 1d when acquiring the imaging signals are retained at the line memory 40 as data for correction of the vertical stripe-like noise and horizontal dark shading. The vertical stripe-like noise and horizontal dark shading are then corrected by subtracting the correction data retained at the line memory 40 from the imaging signals at the time of normal image taking. Here the reason for adding/averaging along the column direction is to make the system less susceptible to random noise components.

Further there is another known technique as one disclosed in Japanese Patent Application Laid-Open Hei-10-313428 where correction data are acquired from an output obtained when light is shut out.

SUMMARY OF THE INVENTION

It is an object of the present invention to provide an imaging apparatus in which it is possible to acquire correction data that are suitable for correcting a vertical stripe-like noise, dark shading in the horizontal direction, etc. of the imaging apparatus.

In a first aspect of the invention, there is provided an imaging apparatus including: a pixel section having a plurality of pixels arranged in two dimensions for effecting photoelectric conversion; a light blocking section for blocking light to conceal the pixel section in accordance with a light blocking instruction signal; a region setting section for outputting the light blocking instruction signal and setting a correcting pixel region from which pixel data for correction are extracted within an effective pixel region of the pixel section where an object image is formed; a line memory for retaining pixel data from the correcting pixel region at the time of blocking light; and a correcting section for correcting an output of pixel data from the pixel section using the pixel data retained at the line memory.

In thus constructed imaging apparatus, the correcting pixel region from which pixel data for correction are extracted is set by the region setting section in the effective pixel region of the pixel section where an object image is formed. In accordance with the light blocking instruction signal outputted from the region setting section, the blocking of light of the pixel section by the light blocking section is executed, and the pixel data outputted from the correcting pixel region at that time are retained at the line memory. An output of pixel data from the pixel section is corrected by the correcting section with using the pixel data retained at the line memory.

In a second aspect of the invention, the region setting section of the imaging apparatus according to the first aspect sets a plurality of lines in a vertical direction of the effective pixel region of the pixel section as the correcting pixel region, and the line memory retains results of vertically adding the pixel data from the plurality of lines.

In thus constructed imaging apparatus, a plurality of lines in the vertical direction are set as the Correcting pixel region by the region setting section, and results of vertical addition of the pixel data from the plurality of lines are retained by the line memory.

In a third aspect of the invention, the correcting section in the imaging apparatus according to the first or second aspect effects correction of the pixel data from the pixel section line by line.

In thus constructed imaging apparatus, correction of pixel data from the pixel section is effected line by line at the correcting section.

In a fourth aspect of the invention, the imaging apparatus according to the second aspect further includes a fault pixel address retaining section for retaining address of fault pixels of the pixel section, and the region setting section sets the plurality of lines based on the address of the fault pixels so that the number of the fault pixels contained therein is equal to or less than a predetermined number.

In thus constructed imaging apparatus, the plurality of lines are set by the region setting section so as to make the number of fault pixels contained therein to be fewer than a predetermined number based on the address retained at the fault pixel address retaining section.

In a fifth aspect of the invention, the region setting section of the imaging apparatus according to any one of the first to fourth aspects updates the correcting pixel region in every one predetermined time period.

In thus constructed imaging apparatus, the correcting pixel region is updated by the region setting section in every one predetermined time period.

In a sixth aspect of the invention, the region setting section of the imaging apparatus according to any one of the first to fifth aspects outputs the light blocking instruction signal in every one predetermined time period, and the pixel data retained at the line memory are updated every time when the light blocking instruction signal is outputted.

In thus constructed imaging apparatus, the light blocking instruction signal is outputted by the region setting section in every one predetermined time period, and the line memory retains updated pixel data every time when the light blocking instruction signal is outputted.

In a seventh aspect of the invention, the region setting section of the imaging apparatus according to any one of the first to fifth aspects outputs the light blocking instruction signal at every one image taking, and the pixel data retained at the line memory are updated at every one image taking.

In thus constructed imaging apparatus, the line memory retains updated pixel data at every one image taking.

DESCRIPTION OF THE PREFERRED EMBODIMENTS

Figure 1A:
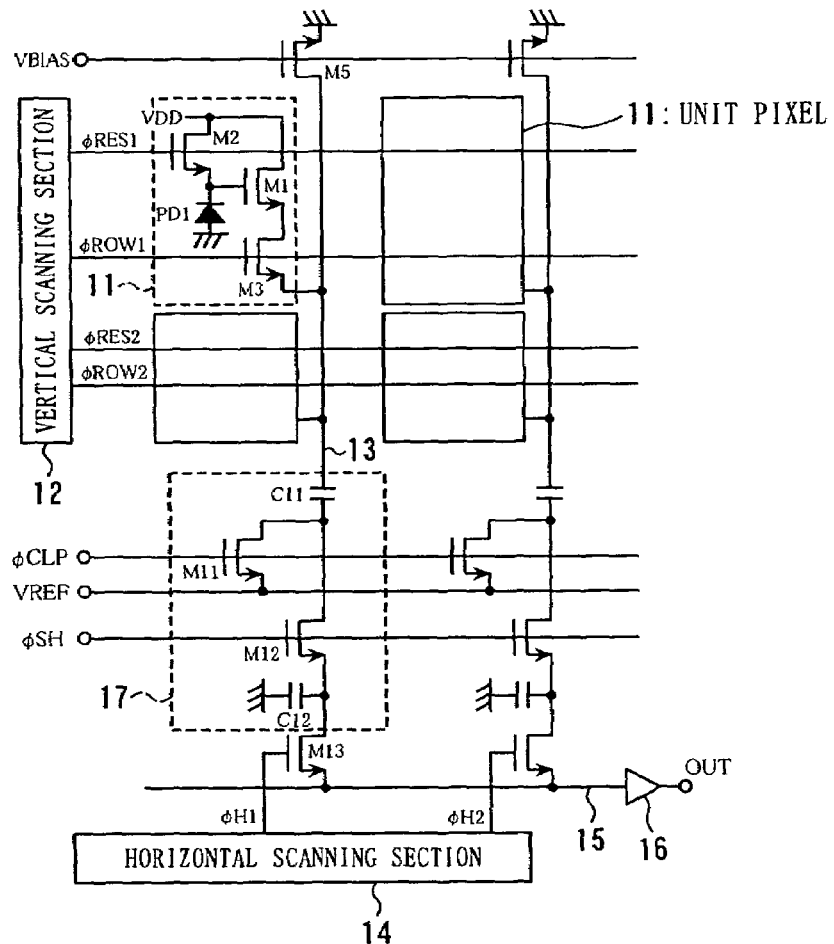
FIGS. 1A and 1B are a circuit diagram showing the construction of a prior-art MOS image sensor and a timing chart for explaining operation thereof.
Figure 1B:
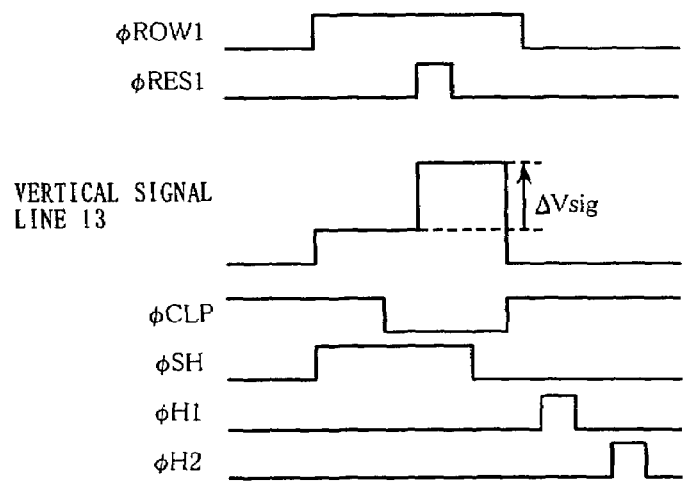
Figure 2:
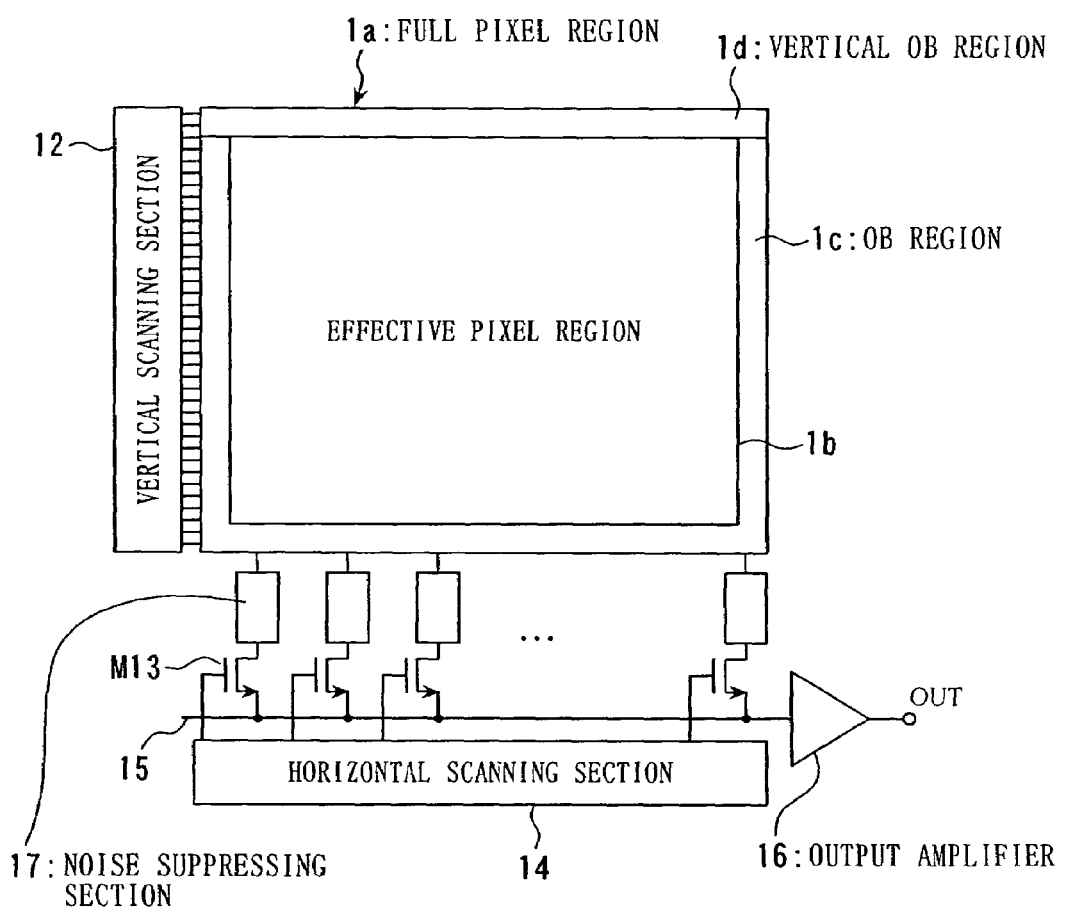
FIG. 2 schematically shows the MOS image sensor shown in FIG. 1A.
Figure 3:
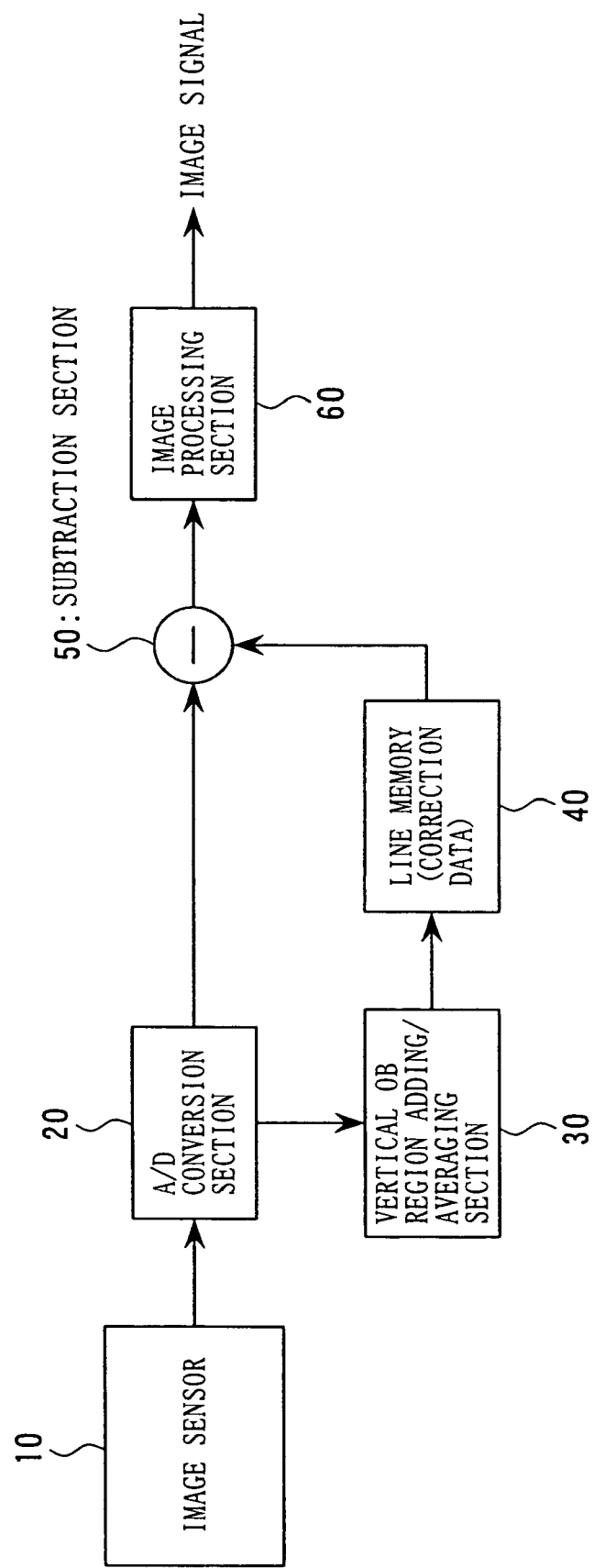
FIG. 3 is a block diagram showing an example of construction of prior-art imaging apparatus using the MOS image sensor shown in FIG. 2.
Figure 4:
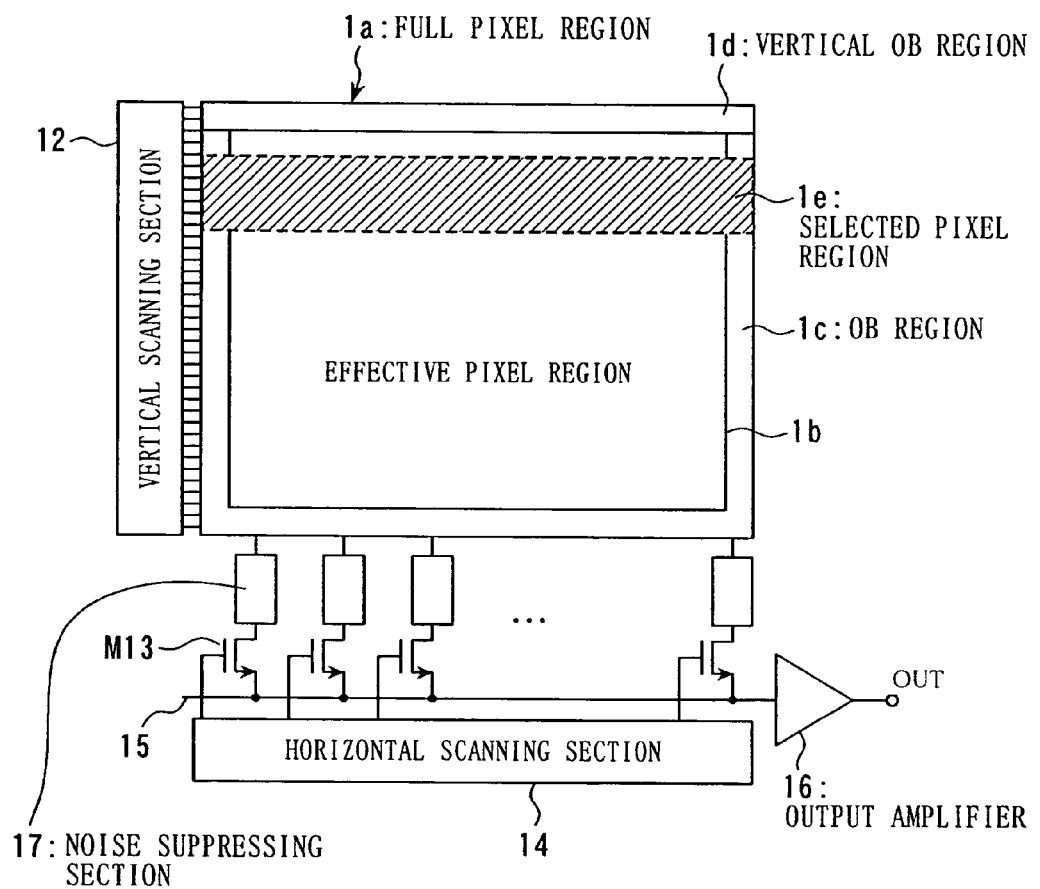
FIG. 4 is a top view schematically showing the construction of image sensor in an embodiment of the imaging apparatus according to the invention.

An embodiment of the invention will now be described with reference to the drawings. FIG. 4 is a top view schematically showing the construction of image sensor in an embodiment of the imaging apparatus according to the present invention. It should be noted that like components as in the prior-art example shown in FIG. 2 are denoted by like reference numerals. The image sensor includes: a full-pixel region (pixel section) 1a where unit pixels similar to that shown in FIG. 1A are disposed in a matrix; a vertical scanning section 12 for driving the unit pixels; a noise suppressing section 17 similar to that shown in FIG. 1A provided for every one column of the full-pixel region 1a; a column select transistor M13 connected at one terminal thereof to the noise suppressing section 17 for reading signals from the noise suppressing section 17; a horizontal signal line 15 connected to the other terminal of the column select transistor M13; an output amplifier 16; and a horizontal scanning section 14 for driving the column select transistor M13. A selected pixel region 1e in FIG. 4 refers to a region consisting of an optional plurality of rows set within the effective pixel region 1b from which pixel data for correction are extracted. As will be described later, an optimal region is set as the selected pixel region 1e to acquire correction data.

Figure 5:
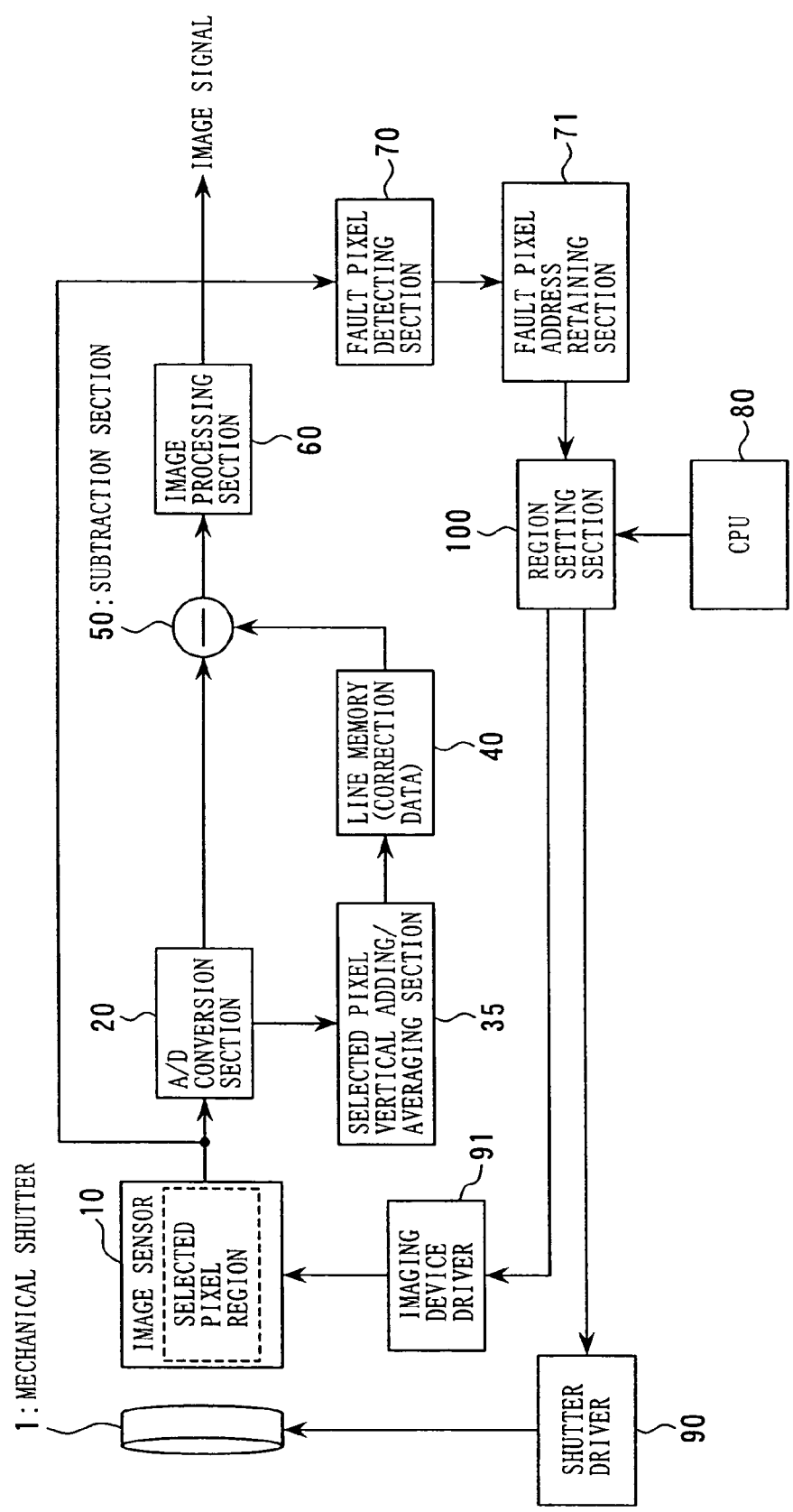
FIG. 5 is a block diagram showing the construction of an embodiment of the imaging apparatus according to the invention using the image sensor shown in FIG. 4.

FIG. 5 is a block diagram showing construction of the imaging apparatus according to the present embodiment mounting the image sensor shown in FIG. 4. The imaging apparatus according to this embodiment includes: a mechanical shutter 1; an image sensor 10; A/D conversion section 20 for converting signals from the image sensor 10 into digital signals; a selected pixel vertically adding/averaging section 35 for adding/averaging in the column direction the signals from the A/D conversion section 20 when light is shut out; a line memory 40 for retaining signals (correction data) from the selected pixel vertically adding/averaging section 35; a subtraction section 50 for subtracting correction data retained at the line memory 40 from imaging signals; an image processing section 60 for effecting image processing of and outputting as image signals the signals from the subtraction section 50; a fault pixel detecting section 70 for detecting fault pixels within the image sensor 10; a fault pixel address retaining section 71 for retaining address of the fault pixels; CPU 80; a region setting section 100 for setting a selected pixel region for acquiring correction data in accordance with an instruction from CPU 80; a shutter driver 90 for controlling open/close of the mechanical shutter 1 in accordance with an instruction from the region setting section 100; and an imaging device driver 91 for controlling pixels to be read out of the image sensor 10 in accordance with an instruction from the region setting section 100.

Figure 6:
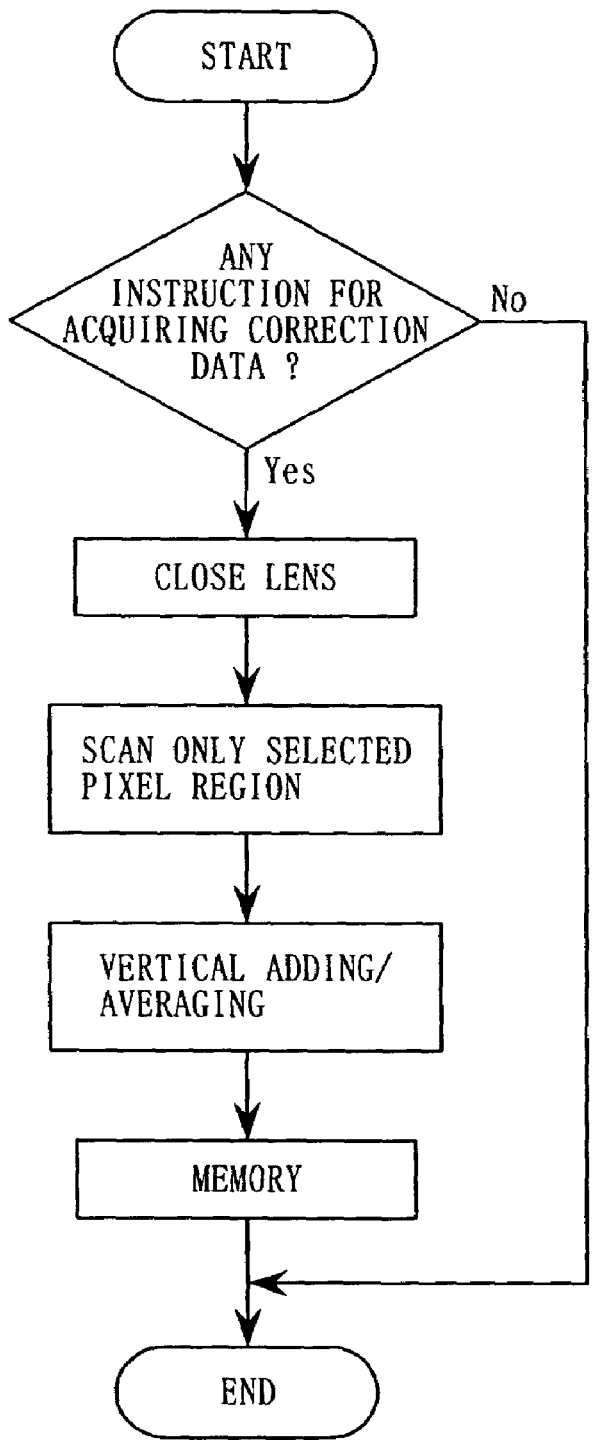
FIG. 6 is a flowchart for explaining operation at the time of acquiring correction data in the imaging apparatus shown in FIG. 5.

A description will now be given by way of the flowchart of FIG. 6 with respect to operation at the time of acquiring correction data for correcting vertical stripe-like noise and horizontal dark shading in the imaging apparatus shown in FIGS. 4 and 5. At the time of acquiring correction data, when an instruction for acquiring correction data is issued from CPU 80, the shutter driver 90 first controls the mechanical shutter 1 in accordance with a signal from the region setting section 100 to bring the image sensor 10 into a state where light is shut out (lens closed). The imaging device driver 91 then controls the vertical scanning section 12 of the image sensor 10 to scan the selected pixel region 1e which has been set in the full-pixel region 1a by the region setting section 100. Further signals of the selected pixel region 1e are read out onto the horizontal signal line 15 by the horizontal scanning section 14 and are outputted from the output amplifier 16. Here, when the scanning of the selected pixel region 1e is finished, the vertical scanning section 12 stops the scanning at that point, and imaging signals corresponding to only the selected pixel region 1e are thereby outputted from the image sensor 10.

The A/D conversion section 20 converts these dark imaging signals of the selected pixel region 1e into digital signals. At the selected pixel vertically adding/averaging section 35, then, the dark imaging digital signals of the selected pixel region 1e are added/averaged (vertically added averaging) in the column direction. These are retained at the line memory 40 as correction data. Note that it is also possible at this time to use the result of adding (vertical addition) the dark imaging digital signals in the column direction as the correction data.

Figure 7:
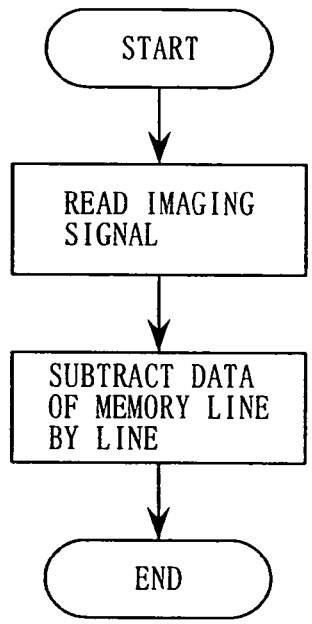
FIG. 7 is a flowchart for explaining correction operation of imaging signals in the imaging apparatus shown in FIG. 5.

An operation for correcting imaging signals at the time of normal image taking will now be described by way of the flowchart of FIG. 7. The imaging signals of the full-pixel region 1a are outputted line by line from the image sensor 10. These imaging signals are converted into digital signals at the A/D conversion section 20. What are obtained by subtracting correction data retained at the line memory 40 from such digital signals at the subtraction section 50 are inputted into the image processing section 60. The above processing is effected for the imaging signals of every one line. The imaging signals after correction are subjected to image processing at the image processing section 60, and corrected image signals are outputted.

Figure 8:
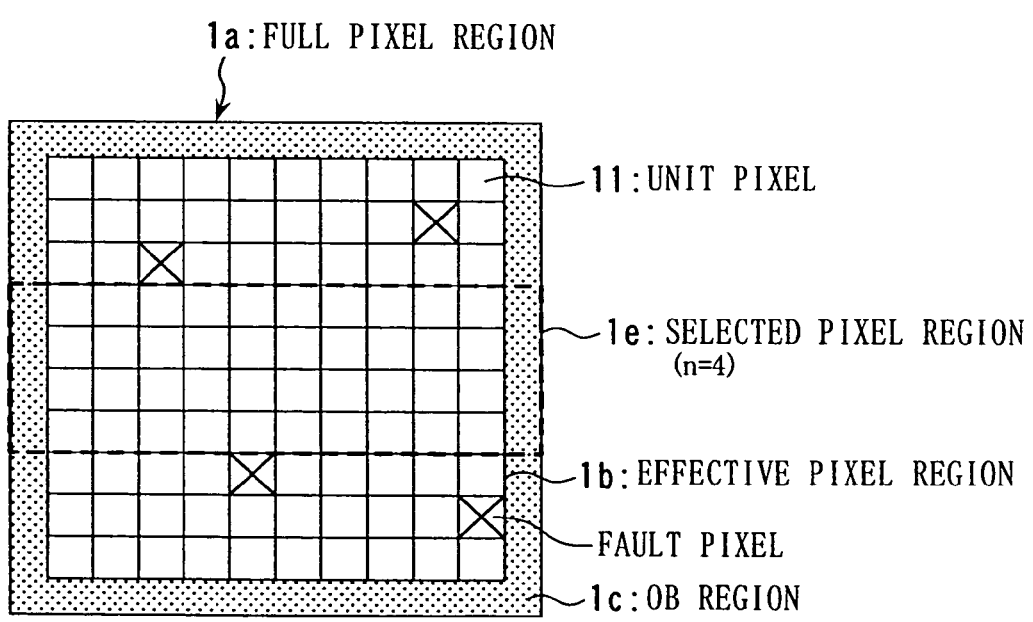
FIG. 8 illustrates a mode of setting a selected pixel region (correcting pixel region) in the image sensor shown in FIG. 4.

A description will now be given with respect to the setting of the selected pixel region 1e. As described above, the selected pixel region 1e is set within the effective pixel region 1b. Such setting makes it possible to acquire pixel data for correction having substantially the same pixel characteristics as the pixels from which imaging signals are acquired at the time of normal image taking, i.e., as the pixels within the effective pixel region 1b that are suitable for correcting vertical stripe-like noise and/or dark shading in the horizontal direction, etc. FIG. 8 shows in an extracted manner the full-pixel region 1a of the image sensor shown in FIG. 4, where like components as in FIG. 4 are denoted by like reference numerals. There are the effective pixel region 1b and OB region 1c within the full-pixel region 1a. Here the unit pixels 11 contain fault pixels from which normal output signal cannot be obtained. Thus, as shown in FIG. 5, detection of fault pixels (indicated by symbol X in FIG. 8) within the full-pixel region 1a is effected by the fault pixel detecting section 70 at the time of shipment from factory and/or when power supply is turned ON. If there are fault pixels, their addresses are retained at the fault pixel address retaining section 71.

Figure 9:
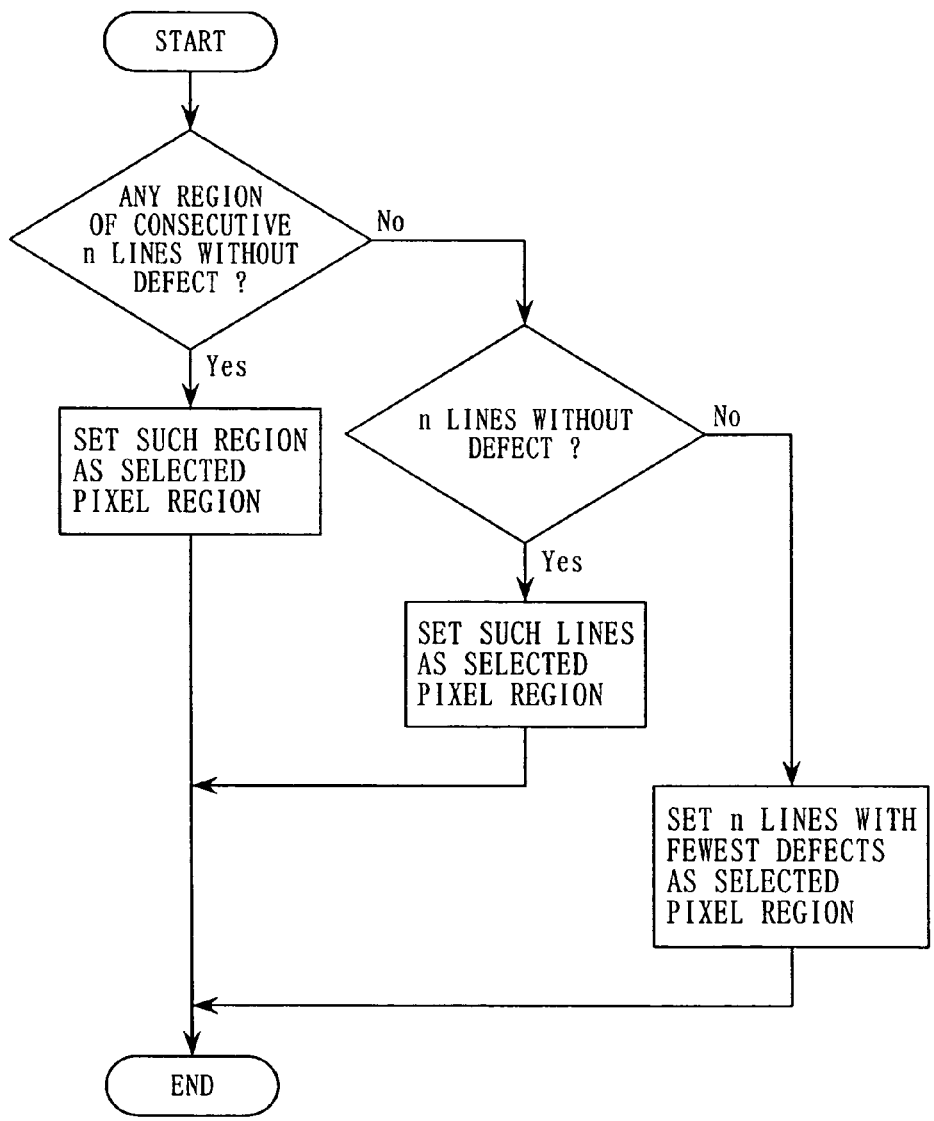
FIG. 9 is a flowchart for explaining a method of setting a selected pixel region by the region setting section of the imaging apparatus shown in FIG. 5.

FIG. 9 is a flowchart showing a method of setting the selected pixel region 1e by the region setting section 100 with taking the fault pixels into consideration. Here it is supposed that the number of lines of the selected pixel region 1e is n. First, it is checked from the fault pixel addresses stored at the fault pixel address retaining section 71 as to whether or not there is a consecutive n-line region without a fault pixel. FIG. 8 shows the case where consecutive n lines (n=4 in the illustrated example) without a fault pixel is detected. Such a region is set by the region setting section 100 as the selected pixel region 1e.

Figure 10:
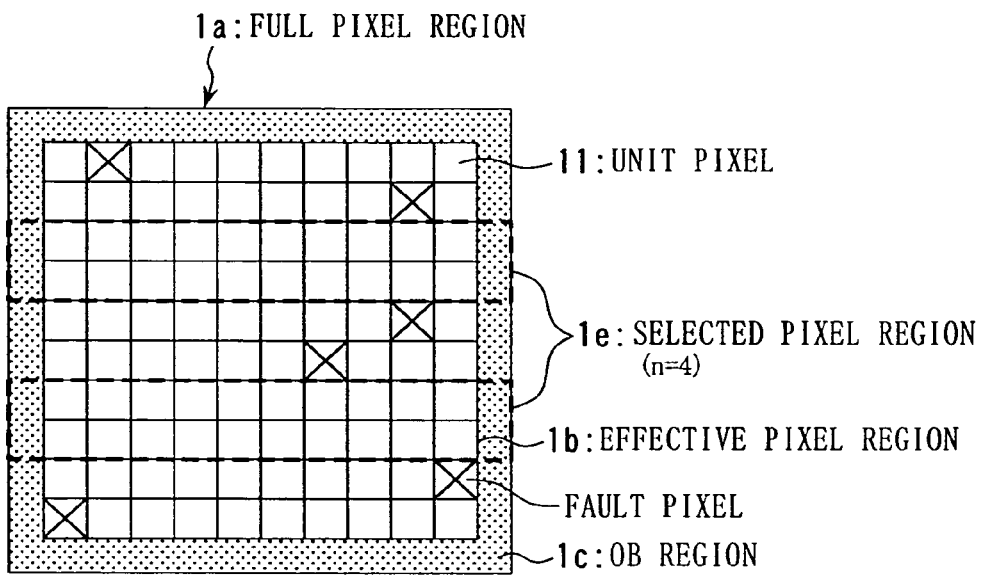
FIG. 10 illustrates another mode of setting a selected pixel region in the image sensor shown in FIG. 4.
Figure 11:
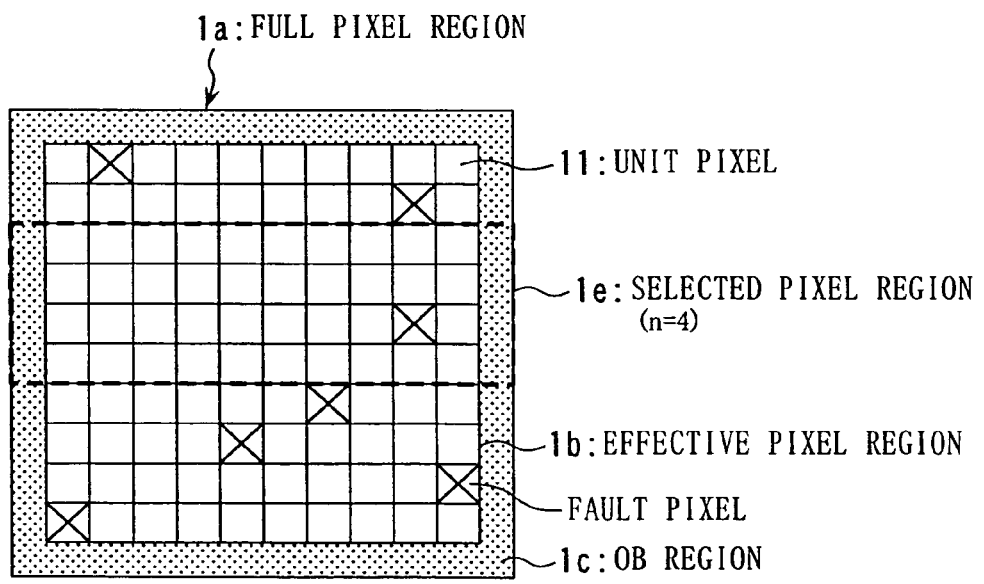
FIG. 11 illustrates yet another mode of setting a selected pixel region in the image sensor shown in FIG. 4.

If a region of consecutive n lines without a fault pixel is absent, the selected pixel region 1e is set so as to have a total of n lines without a fault pixel. For example, the selected pixel region 1e is set as having n lines (n=4 in the illustrated example) by two regions as shown in FIG. 10. Further, if the number of lines without a fault pixel is less than n even when added together, the selected pixel region 1e is set with selecting n lines where fault pixels are fewest. For example, the selected pixel region 1e is set with selecting consecutive n lines (n=4 in the illustrated example) containing one fault pixel as shown in FIG. 11.

As the above, the setting of the selected pixel region 1e within the effective pixel region 1b makes it possible to acquire correction data by a region where no fault pixel is contained or where the number of fault pixels is less than or equal to a predetermined number. It is thereby possible to correct vertical stripes and horizontal dark shading with using more suitable correction data. It should be noted that the number of lines of the selected pixel region 1e may be set at will. A reduction of random noise becomes possible as the number of lines is increased, while, on the other hand, the time for acquiring correction data can be shortened as the number of lines is reduced. About 16 lines are normally adequate and reasonable.

It suffices to set the selected pixel region 1e for example at the time of shipment from factory. Further, even if a posterior defect occurs, a region suitable for acquiring correction data can be set as the selected pixel region 1e by setting it for example when power supply is turned ON. It is also possible to update the selected pixel region 1e in every one predetermined time period.

By suitably effecting an acquisition of correction data, for example, in every one predetermined time period in accordance with stability of the system and/or characteristics of the image sensor in its environment, correction may correspond to change in dark vertical stripes and/or horizontal dark shading that occurs for example due to change in temperature. Further, by acquiring correction data at every image taking, an optimum correction is always possible of dark vertical stripes and/or dark shading in the horizontal direction.

As has been described by way of the above embodiment, it becomes possible according to the first aspect of the invention to acquire pixel data for correction having substantially the same characteristics of pixel as the pixels from which imaging signals are acquired at the time of normal image taking, by setting a region for extracting correcting pixel data within an effective pixel region of the pixel section. An imaging apparatus is thereby achieved as capable of acquiring correction data suitable for correcting for example vertical stripe-like noise and/or dark shading in the horizontal direction. According to the second aspect of the invention, random noise is suppressed by vertically adding pixel data from a plurality of lines so that correcting pixel data having high level of accuracy can be obtained. According to the third aspect of the invention, a line-by-line correction of the pixel data from the pixel section becomes possible. According to the fourth aspect of the invention, correction data having high level of accuracy can be acquired, since a plurality of lines are set so as to have fault pixels fewer than a predetermined number. According to the fifth to seventh aspects of the invention, it becomes possible to obtain correcting pixel data that corresponds to change in pixel characteristics resulting from the passage of time.

What is claimed is:

1. An imaging apparatus comprising:
    a pixel section having a plurality of pixels arranged in two dimensions for effecting a photoelectric conversion, the pixel section including an effective pixel region where an object image is formed;
    a light blocking section for blocking a light to conceal said pixel section in accordance with a light blocking instruction signal;
    a region setting section for outputting said light blocking instruction signal and setting, at the time of blocking light, a correcting pixel region within the effective pixel region;
    a calculating section for processing the plurality of the pixel lines in the correcting pixel region to obtain a line of correction data for vertical stripe-like noise and horizontal dark shading;
    said correction data is based on the plurality of pixel lines in the correcting pixel region where no fault pixel is contained or where the number of fault pixels having fault is less than or equal to a predetermined number;
    a line memory for retaining the line of correction data from the calculating section; and
    a correcting section for correcting an output of pixel data from said effective pixel region using the line of correction data retained at said line memory.

2. The imaging apparatus according to claim 1, wherein said region setting section sets a plurality of lines in a vertical direction of the effective pixel region of said pixel section as said correcting pixel region, and said line memory retains results of vertically adding said pixel data from said plurality of lines.

3. The imaging apparatus according to claim 1, wherein said correcting section effects the correction of the pixel data from said pixel section line by line.

4. The imaging apparatus according to claim 2 further comprising a fault pixel address retaining section for retaining address of fault pixels of said pixel section, wherein said region setting section sets said plurality of lines based on the address of said fault pixels so that the number of said fault pixels contained therein is equal to or less than a predetermined number.

5. The imaging apparatus according to claim 1, wherein said region setting section updates said correcting pixel region in every one predetermined time period.

6. The imaging apparatus according to claim 1, wherein said region setting section outputs said light blocking instruction signal in every one predetermined time period, and the pixel data retained at said line memory are updated every time when said light blocking instruction signal is outputted.

7. The imaging apparatus according to claim 1, wherein said region setting section outputs said light blocking instruction signal at every one image taking, and the pixel data retained at said line memory are updated at every one image taking.

8. The imaging apparatus according to claim 1, further comprising a fault pixel defining section for detecting fault pixels in the effective pixel region and retaining addresses of the fault pixels detected, wherein the correcting pixel region including a plurality of pixel lines with at the lowest possible number of fault pixels.

* * * * *